United States Patent [19]

Brühwiler

[11] Patent Number: 5,209,086
[45] Date of Patent: May 11, 1993

[54] ANTI-THEFT APPARATUS

[75] Inventor: Othmar Brühwiler, Gossau, Switzerland

[73] Assignee: Pataco AG, Elgg, Switzerland

[21] Appl. No.: 859,044

[22] Filed: Mar. 27, 1992

[30] Foreign Application Priority Data

Apr. 8, 1991 [CH] Switzerland .................. 1033/91

[51] Int. Cl.⁵ ............................................. E05B 65/00
[52] U.S. Cl. ........................................ 70/57.1; 70/63
[58] Field of Search .................. 70/57, 58, 57.1, 63; 340/572, 568; 206/1.5, 387

[56] References Cited

U.S. PATENT DOCUMENTS

| | | | |
|---|---|---|---|
| 3,613,413 | 10/1971 | Glass et al. | 70/63 X |
| 3,828,922 | 8/1974 | Holkestad | 70/63 X |
| 3,933,240 | 1/1976 | Humble | 70/63 X |
| 4,196,424 | 4/1980 | Williamson | 70/57.1 X |
| 4,216,857 | 8/1980 | Huang | 70/63 X |
| 4,834,238 | 5/1989 | Hehn et al. | 70/63 X |
| 4,918,954 | 4/1990 | Stickel et al. | 70/57 X |
| 4,966,020 | 10/1990 | Fotheringham et al. | 70/58 X |
| 5,039,982 | 8/1991 | Bruhwiler | 70/58 X |
| 5,079,540 | 1/1992 | Narlow et al. | 70/57.1 X |

*Primary Examiner*—Peter M. Cuomo
*Assistant Examiner*—Suzanne L. Dino
*Attorney, Agent, or Firm*—Watson, Cole, Grindle & Watson

[57] ABSTRACT

An anti-theft apparatus includes a bracket-shaped auxiliary member which is displaceably guided longitudinally along a narrow side of a casing and has ends which are bent inwardly in order to clamp a box-like article. When the bracket is in its slid out position relative to the casing, its outer end can be bent in an elastic manner to enable removal or insertion of the article, and the inner end of the bracket has a locking lug which also projects inwardly to snap into a locking slot at the narrow side of the casing opposite of the slide-in opening when the bracket is completely inserted into the casing. The locking lug can be released out of this position only by use of a special tool.

8 Claims, 3 Drawing Sheets

ANTI-THEFT APPARATUS

BACKGROUND OF THE INVENTION

1. Field of the Invention

The present invention relates to an anti-theft apparatus for a box-shaped article intended to be sold, specifically a cassette with a data carrier, such as, e.g., a compact disk, having a casing for receipt of the article, which casing includes at least one narrow side having a slide-in opening and a signal transmitter adapted to trigger an alarm, having locking means arranged on or cooperating with same and which are adapted to engage the article located in the casing, which locking means are adapted to be unlocked in order to separate the article from the casing.

1. Description of the Prior Art

The casing of known apparatuses, of the kind set forth above consists commonly of a hard plastic material, which casing is adapted to receive a box-shaped article to be rendered safe against theft such as for instance a CD-cassette, whereby the casing is equipped with a so-called oscillating circuit label, such that when passing an induction loop located at the exit of stores or warehouses, an alarm is triggered when the casing including the article is taken along without having been paid for. Generally, the reusable casing is severed by means of a special tool from the CD-cassette at the cash register of the store. Hereto a great variety of locking systems are known, whereby the operation thereof is made by bolts, pegs or hooks which couple the casing to the article until the uncoupling is done by means of a special tool.

As mentioned above, a great variety of locking system has been used on used casings of a hard plastic material. A drawback is that a safe locking was not always secured. Also in the future structure of the casing will have to be changed due to environmental reasons, i.e., in place of a hard plastic material softer more environmentally harmless plastic will be used. Most of the earlier systems cannot be used with such so-called soft casings because when exerting common forces a separation between casing and article can be achieved relatively easily. Thus, quite obviously the object of the desired anti-theft apparatus is no longer met.

SUMMARY OF THE INVENTION

Therefore, it is a general object of the present invention to provide a novel locking system which can be used independently from the properties of the casings and is in a position to securely safeguard an article inserted into the casing against theft.

A further object is to provide a locking system which can be used apart from casings of plastic materials also in casings made of a hard paper such as cardboard.

Yet a further object is to provide an anti-theft apparatus which includes a bracket-shaped auxiliary member guided at the inner side of one of two opposite narrow sides of the casing for a longitudinal displacement, which auxiliary member includes at both its ends a perpendicularly projecting stiff leg, whereby the box-shaped article is caught between these legs during a displacing of the auxiliary member, which bracket-shaped auxiliary member has an end piece positioned at, the, outside, which end piece is elastically bendable, allow removal of the article from the bracket and an insertion of same when the bracket is in its drawn-out position, whereby the end of the bracket positioned at the inside includes a locking lug located adjacent the projecting leg and positioned, as seen in the longitudinal direction of the bracket, outside of the leg and projecting also towards the inside, which lug is adapted to snap into a locking slot at the narrow side of the casing located opposite the slide-in opening when the bracket is at least substantially completely slid into the casing, whereby the desired unlocking proceeds by means of a special tool.

The basic structure is, accordingly, the bracket-shaped auxiliary member which consists preferably of a magnetic material, specifically of steel, such that the unlocking can proceed by a magnet acting onto the end of the bracket.

A further object is to provide an anti-theft apparatus in which the bracket-shaped auxiliary member is mounted or guided, in a longitudinally displaceable manner in a longitudinal slot in the corresponding narrow side of the casing.

Yet a further object is to provide an anti-theft apparatus in which the length of the bracket-shaped auxiliary member exceeds the length of the corresponding narrow side of the casing, such that the article can be pulled out of the casing at any time. Such could also be reached basically in that the casing has at the side of the slide-in opening recesses which allow a gripping of the article.

Still a further object is to provide an apparatus in which the end of the bracket located at the outside includes a corner reinforcement in the form of a plate formed along a web leg edge extending between the web proper of the bracket and the leg projecting towards the inside.

A further object is to provide an apparatus in which the end of the bracket located at the inside includes a longitudinal slot which separates the end of the bracket into two separately elastically yielding tongues, whereby the holding leg projecting towards the inside is positioned at the end of one tongue, and in which the arresting lug which is also angled towards the inside is formed at the end of the other somewhat longer tongue.

Still a further object is to provide an apparatus in which an incline for the tongue which includes the holding leg is positioned at the end of the narrow side of the casing located at the inside and guiding the bracket-shaped auxiliary member, such that when the bracket is in its pushed in position, the end of the bracket located at, the inside and including the two tongues is forced slightly. In this way, inwards the moving of the locking lug into its locking position is guaranteed, but without a preventing of the unlocking.

A further object is to provide an apparatus in which the locking slot is located at the narrow side of the casing opposite of the slide-in opening at the area of the corner of two perpendicularly adjacent narrow sides.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
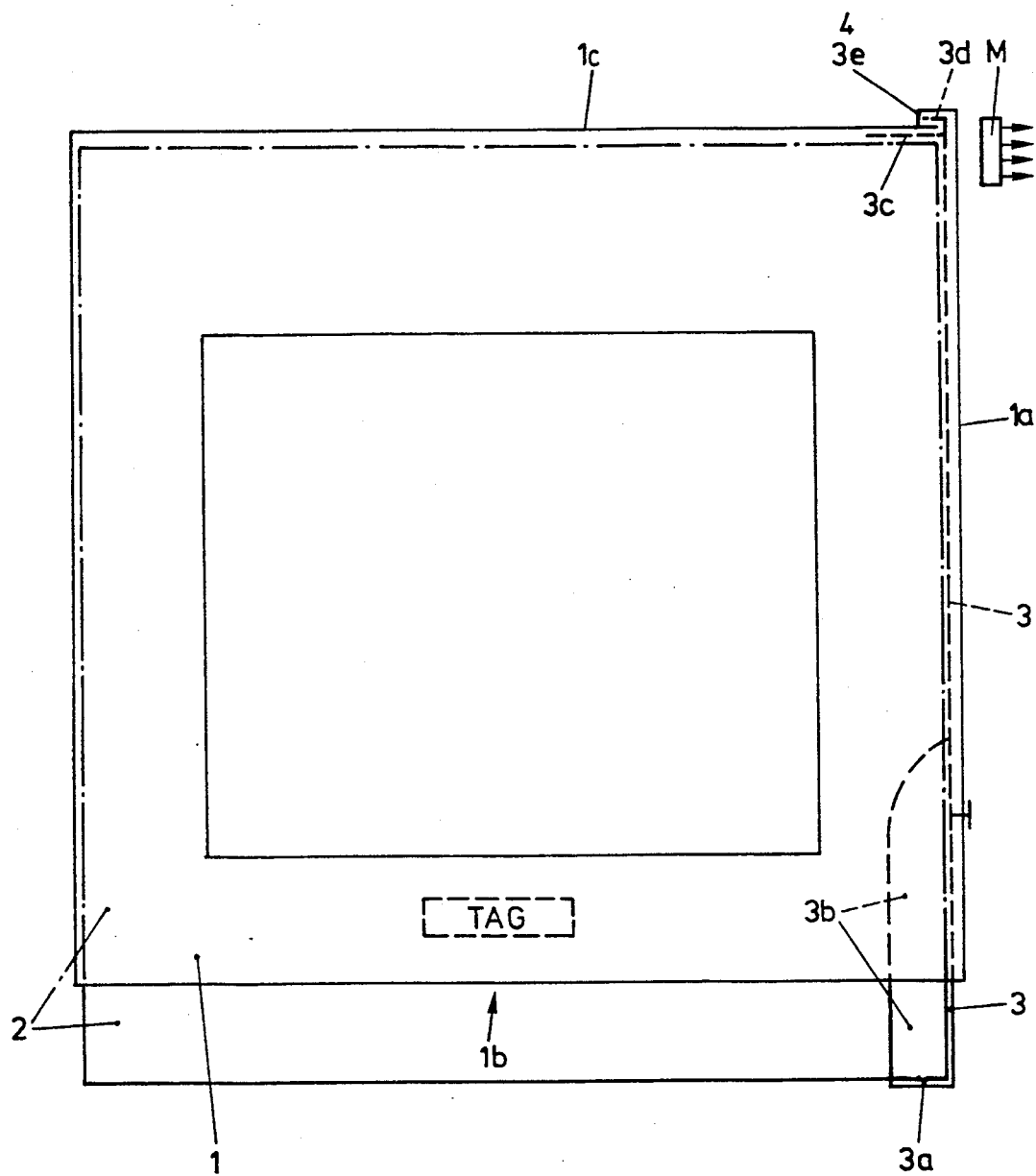
FIG. 1 is a general top view of an anti-theft apparatus structured in accordance with the invention; the casing locked.
Figure 2A:
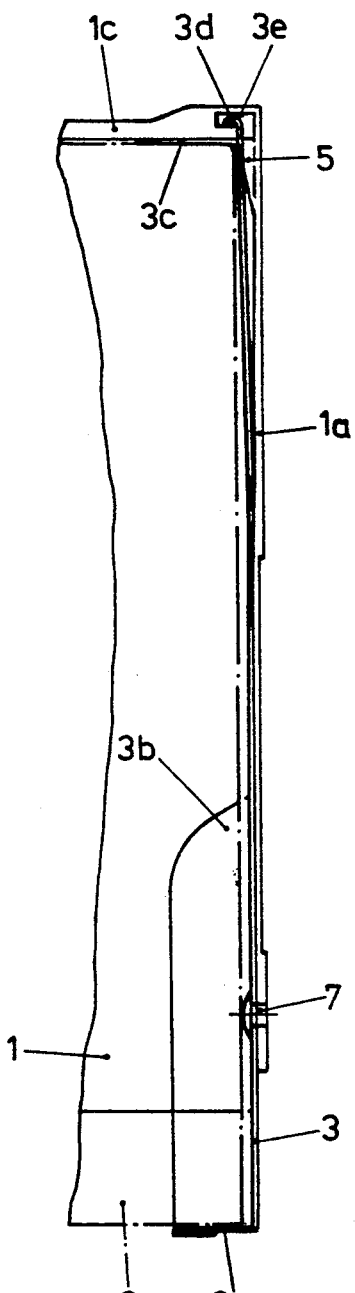
FIG. 2a is a view of a part of the apparatus having the casing locked.
Figure 3:
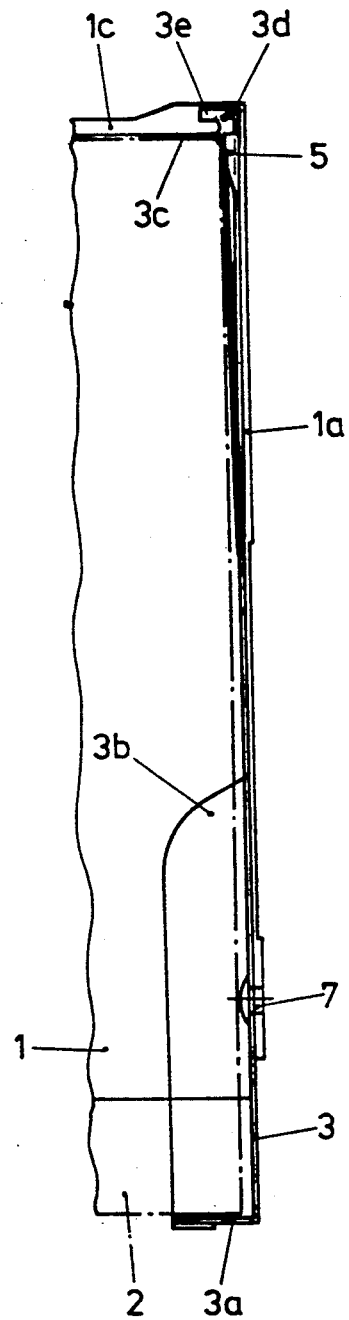
FIG. 3 is a view similar to FIG. 2a, in which the locking lug has been pulled out of the locking position by means of a special tool.
Figure 2B:
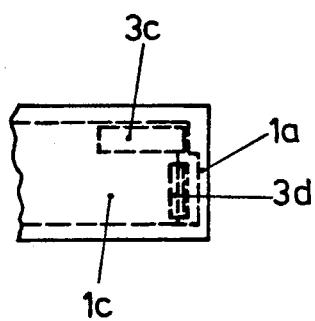
FIG. 2b is a partial top view illustrating the locking location proper;.

FIG. 1 illustrates a casing 1 of a plastic material or of hard paper having at a narrow side 1b a slide-in opening for a box-shaped article. The locking means comprise here a bracket-shaped auxiliary member 3 which is displaceably (movably) guided in a longitudinal direction along a narrow side 1a of the casing (the displacing can proceed at least over half of the length of the narrow side). The auxiliary member 3 includes two stiff legs 3a, 3c extending at right angles towards the inside, whereby the box shaped article 2 is safely kept (encased in a clamp like manner between these two legs, 3a, 3c) during the displacing. When the auxiliary member 3 is in its slid in position a locking lug 3d which projects somewhat over the legs 3c, engages and snaps into a locking slot 3e at the narrow side 1c of the casing 1 and can be unlocked out of this position only by means of a magnet M. In the unlocked state the article 2 can be pulled out of the casing together with the auxiliary member 3 until an abutment stop is reached. In this position the lower end of the auxiliary member 3 can also be bent outwards and the article 2 can be completely removed from the casing. The mechanics will be explained more in detail further below.

Basically, the auxiliary member 3 could also extend freely along the narrow side 1a, i.e., it must not be held fixedly. For practical reasons it is, however, better to hold the auxiliary member 3 at the narrow side 1a of the casing 1 in a longitudinally displaceable manner.

It is also possible to foresee a mechanical mechanism in place of the magnetic unlocking mechanism whereby a special tool moves the locking lug 3d out of its locking position.

Further details of the inventive anti-theft apparatus are illustrated in FIGS. 2a to 6.

These figures illustrate specifically how the bracket shaped auxiliary member 3 is displaceably held by means of a rivet 7 in a longitudinal slot 6 in the narrow side 1a of the casing. The auxiliary member can be displaced out of the casing until the rivot 7 abuts the end 6a (abutment stop) of the slot 6 (see FIG. 6). The figures also disclose how the stiffening of the outer corner section of the auxiliary member 3 is achieved: between the corner formed by the web 3 and the legs 3a a reinforcing plate 3b extends between their edges, its size depending on the length of the leg 3a, but, however, can basically be selected freely. The plate 3b forms kind of a bottom of a box between the web 3 and the leg 3a.

The drawings illustrate also that the inner end of the bracket-shaped auxiliary member is divided by a longitudinal slot 8 into two tongues 9, 10, whereby the holding leg 3c is located at the end of the tongue 9 and the locking lug 3d which also projects towards the inside is located at the end of the tongue 10 which projects somewhat over the tongue 9. An incline 5 is arranged in the area of the tongue 9 at the inner side of the narrow side 1a, which upon the sliding in of the bracket-shaped auxiliary member 3 lifts at its final phase the tongue 9 somewhat and presses same inwards onto the article. Because the tongues 9 and 10 are really made of one piece, the tongue 10 which carries the locking lug 3d is also pulled towards the inside such that in the final position it is definitely positioned in the locking slot 3e and can be pulled back out of the locking position only by means of the special tool (magnet M) when in mentioned position.

Figure 4:
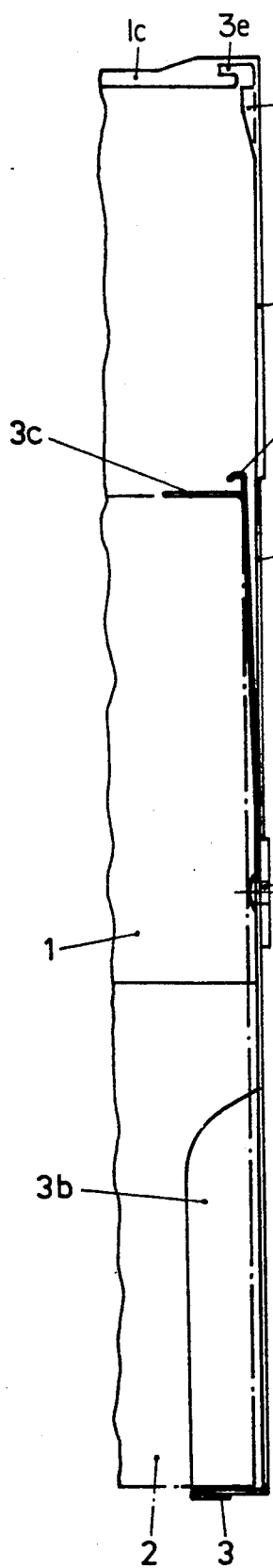
FIG. 4 is a view of a part of the apparatus according to FIG. 2 and 3 in which the bracket-shaped auxiliary member has been pulled out completely.
Figure 5:
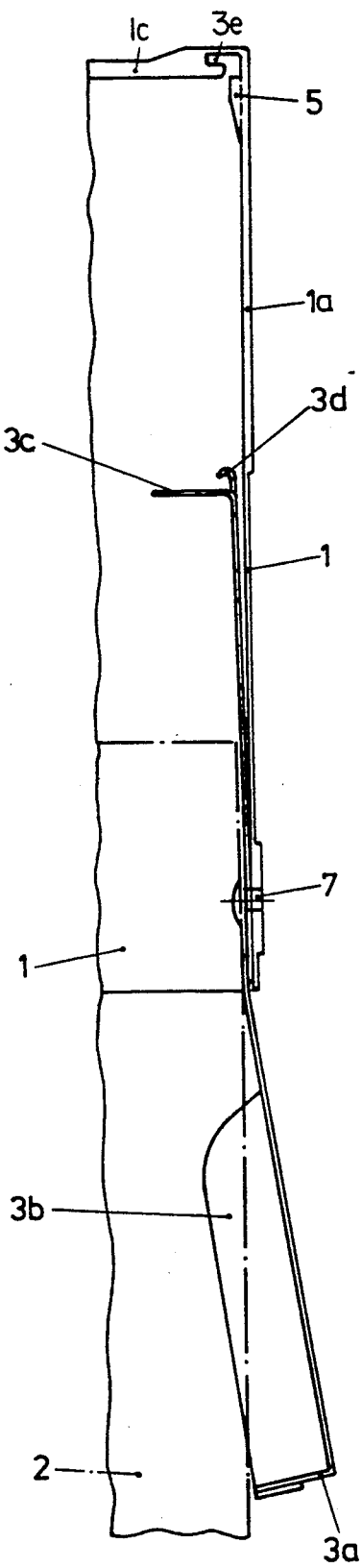
FIG. 5 is an illustration similar to FIG. 4 including the auxiliary element in a spring elastically bent out state, whereby in this position of the auxiliary element the article can be freely removed from the casing.
Figure 6:
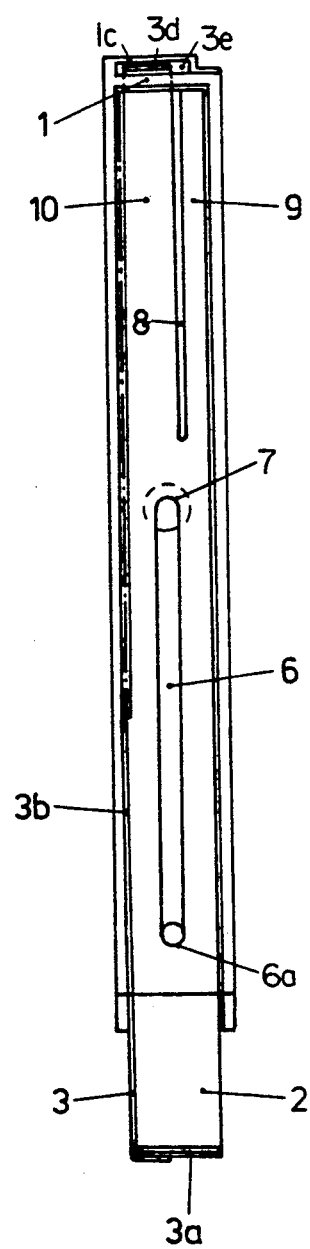
FIG. 6 is a side view of the apparatus in the position of FIGS. 2a and 3.

FIG. 4 of the drawings illustrates the apparatus when the auxiliary member has been moved out and FIG. 5 illustrates how, if in this position, the lower end of the bracket-shaped auxiliary member 3 can be bent in an elastic manner such that the enclosed article can easily be pulled out of the casing. This position is also the one which allows a setting of an article to be made secure into the bracket-shaped auxiliary member (clamp) and finally into the protecting casing.

The locking slot 3e is positioned in the upper narrow side of the casing and can be made there during the production of the casing without any further problems.

The illustrated design reveals that it is possible to form an extraordinarily safe apparatus by most simple means. It, thereby, is not important if the casing is composed of a hard plastic material, soft plastic material or even hard paper (cardboard). The use of the bracket-shaped auxiliary member allows a safe locking also in case of less rigid materials.

While there is shown and described a present preferred embodiment of the invention, it is to be distinctly understood that the invention is not limited thereto, but may be otherwise variously embodied and practiced within the scope of the following claims.

I claim:

1. An anti-theft apparatus for a box-shaped article intended to be sold, such as a cassette with a data carrier, having a casing for receipt of the article, which casing includes at least one narrow side having a slide-in opening and a single transmitter adapted to trigger an alarm, having locking means arranged on and cooperating with said casing which are adapted to engage the article located in the casing, which locking means are adapted to be unlocked in order to separate the article from the casing, comprising a bracket-shaped auxiliary member guided at the inner side of one of two opposite narrow sides of the casing for a longitudinal displacement, which auxiliary member includes at both its ends a perpendicularly projecting stiff leg, whereby the box-shaped article is caught between said legs during a displacing, which bracket-shaped member has an end piece positioned at the outside which is elastically bendable to allow removal of the article from the bracket and insertion of said article when the bracket is in its drawn-out position, whereby the end of the bracket positioned at the inside includes a locking lug located adjacent the projecting leg and, as seen in a longitudinal direction of the bracket, positioned outside of the leg and projecting also towards the inside, which lug is adapted to snap into a locking slot at the narrow side of the casing located opposite of the slide-in opening when the bracket is at least substantially completely slid into the casing, whereby the desired unlocking is achieved by means of a special tool.

2. The apparatus of claim 1, wherein the bracket-shaped auxiliary member consists of a magnetic material, and unlocking is achievable by a magnet acting onto the end of the bracket.

3. The apparatus of claim 1, wherein the bracket-shaped auxiliary member is mounted in a longitudinally displaceable manner at a longitudinal slot in the corresponding narrow side of the casing.

4. The apparatus of claim 1 wherein a length of the bracket-shaped auxiliary member exceeds a length of the corresponding narrow side of the casing.

5. The apparatus of claim 1, wherein the end of the bracket located at the outside includes a corner reinforcement in the form of a plate formed along a web-leg edge positioned between a web portion of the bracket and the leg projecting towards the inside.

6. The apparatus of claim 1, wherein the end of the bracket located at the inside includes a longitudinal slot forming two separate elastic tongues, whereby a holding leg projecting towards the inside is positioned at the end of one tongue, and in which an arresting lug which is also angled towards the inside is formed at the end of the other, somewhat longer tongue.

7. The apparatus of claim 6, wherein an incline for the tongue which includes said holding leg is positionable at the inside of the end of said one narrow side of the casing guiding the bracket-shaped auxiliary member, such that when the bracket is in it pushed in position the end of the bracket located at the inside and including the two tongues is forced slightly inwards such that the moving of the locking lug into its locking position is guaranteed without preventing unlocking.

8. The apparatus of claim 1, wherein the locking slot is located said one narrow side of the casing opposite of the slide-in opening at the area of the corner of two perpendicularly adjacent narrow sides.

* * * * *